April 9, 1963 R. A. MENTEL ET AL 3,084,736
GAS-FUELED INFRARED GENERATOR
Filed Dec. 30, 1958 5 Sheets-Sheet 2

INVENTORS
ALLEN W. CURTIS
RAYMOND A. MENTEL
BY
*J. W. Douglas*
ATTORNEY

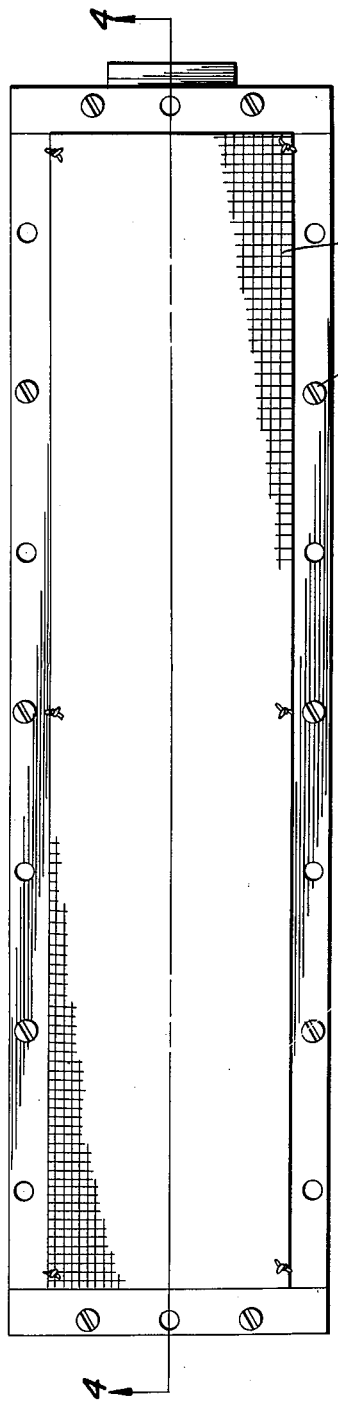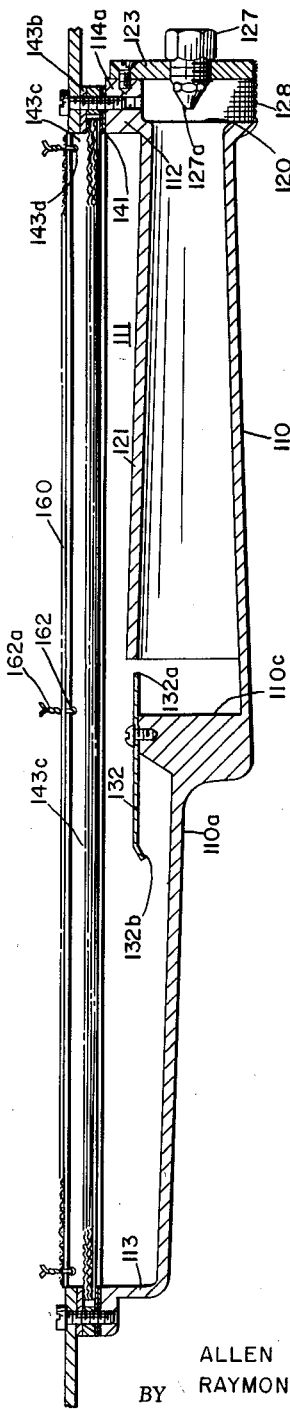

April 9, 1963 R. A. MENTEL ET AL 3,084,736
GAS-FUELED INFRARED GENERATOR
Filed Dec. 30, 1958 5 Sheets-Sheet 4

INVENTORS
ALLEN W. CURTIS
BY RAYMOND A. MENTEL
ATTORNEY

April 9, 1963    R. A. MENTEL ET AL    3,084,736
GAS-FUELED INFRARED GENERATOR
Filed Dec. 30, 1958    5 Sheets-Sheet 5
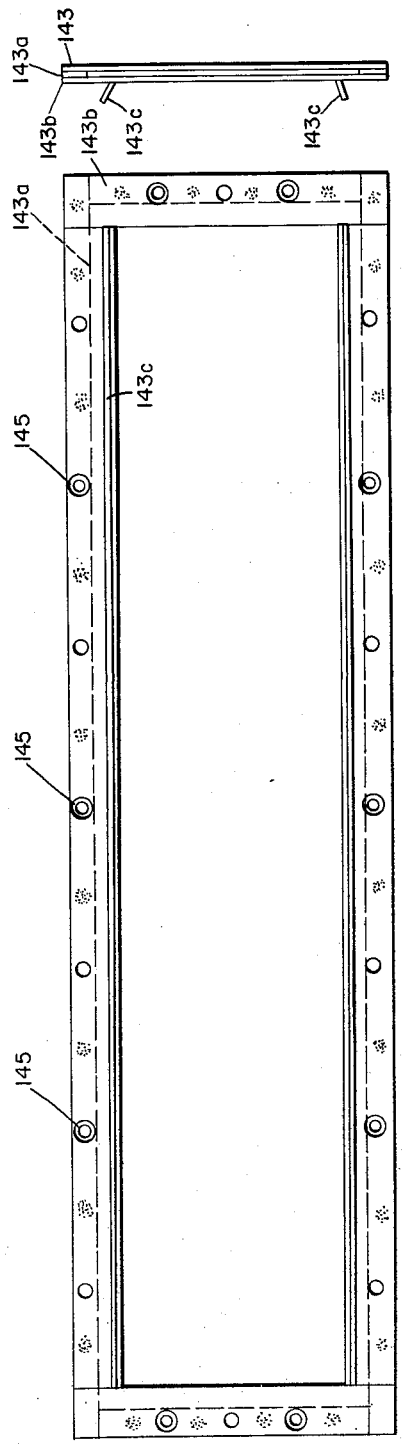
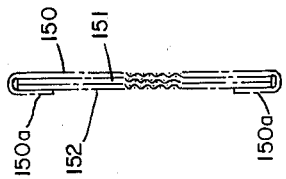
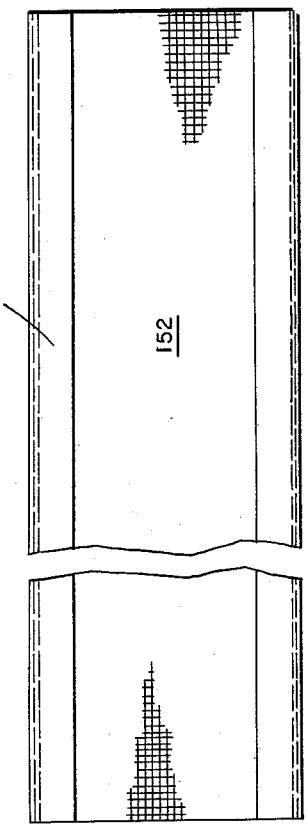
INVENTORS
ALLEN W. CURTIS
BY RAYMOND A. MENTEL
*J. W. Douglas*
*their* ATTORNEY

United States Patent Office 3,084,736
Patented Apr. 9, 1963

3,084,736
GAS-FUELED INFRARED GENERATOR
Raymond A. Mentel, Cleveland Heights, and Allen W. Curtis, Berea, Ohio, assignors to International Radiant Corporation, Berea, Ohio, a corporation of Ohio
Filed Dec. 30, 1958, Ser. No. 785,105
14 Claims. (Cl. 158—114)

This invention relates to infrared ray producing devices and more particularly to a device for burning liquid or gaseous fuel to generate infra red rays. It is a continuation-in-part of our copending application Serial No. 739,570, filed June 3, 1958, for "Infra Red Burner," now abandoned.

Although infra red ray generators have come to be well known in the art, there have been many inherent defects in such devices which the present invention overcomes.

Perhaps the most prominent disadvantage of prior devices resulted from the use of ceramic burner elements. The ceramic burner element usually comprises a ceramic plate of a material thickness through which there are small holes that allow the passage of the combustible fuel mixture. If the holes are of large daimeter, the variation in fuel pressure or temperature may cause the burner flame to pass back or flash back into the mixer or plenum chamber. If the holes are made small, they become easily clogged and also limit the amount of fuel that may be burned and hence the heat output. Not the least disadvantage is the fact that ceramics are costly, fragile and difficult to replace when they become broken or worn out.

By the present invention it is possible to provide a generator which is much cheaper to manufacture, much more rugged than prior devices, easier to keep clean, is a lighter weight and wherein it is easier to replace the generator elements. In addition, the generator provides a more even distribution of flame and hence may be throttled to give various degrees of heat.

In the present invention these advantages are achieved by a novel burner structure which includes a fine mesh flat burner screen, at which a low blanket of flame is produced completely across the burner screen, and an overlying flat coarse reverberator screen. The reverberator screen is positioned beyond the blanket of flame so that it is not directly contacted by the flame. Heat is reflected from the reverberator screen back to the burner screen to assist in bringing the burner screen to incandescence. The burner screen is mounted so as to be capable of lateral expansion and contraction due to changes in its temperature, so that the burner screen at all times remains flat and evenly spaced across its entire surface area from the overlying reverberator screen. With this novel arrangement the temperature across the entire surface of the burner screen is kept exceptionally uniform, which is necessary to the optimum performance of the burner, and which would not be possible if the burner screen were clamped in place at its edges.

It is a general object of this invention to provide a novel and improved radiant burner.

It is also an object of this invention to provide a novel radiant burner which has a highly uniform temperature completely thereacross.

Another object of this invention is to provide a novel radiant burner which can be operated over a long period of time at a temperature substantially higher than possible heretofore.

Another object of this invention is to provide a novel radiant burner having improved efficiency.

Another object of this invention is to provide a novel radiant burner which is capable of improved operation over a range of fuel pressures and in which the air-fuel ratio does not change appreciably over such range of fuel pressures.

Another object of this invention is to provide a novel radiant burner having a novel burner head arrangement which is readily detachable as a unit from the burner housing.

Still other advantages of the invention and the invention itself will become more apparent from the following description of two presently preferred embodiments thereof which are illustrated in the accompanying drawings forming a part of this specification.

In the drawings:

FIG. 4 is a vertical longitudinal medial sectional view of another embodiment of our invention;

FIG. 6 is a top plan view thereof;

FIG. 9 is a plan view of the burner screen frame with certain of the underlying parts shown in dashed lines;

FIG. 10 is an end view thereof;

FIG. 11 is a broken plan view of the burner screen assembly; and

FIG. 12 is an end view thereof.

Figure 2:
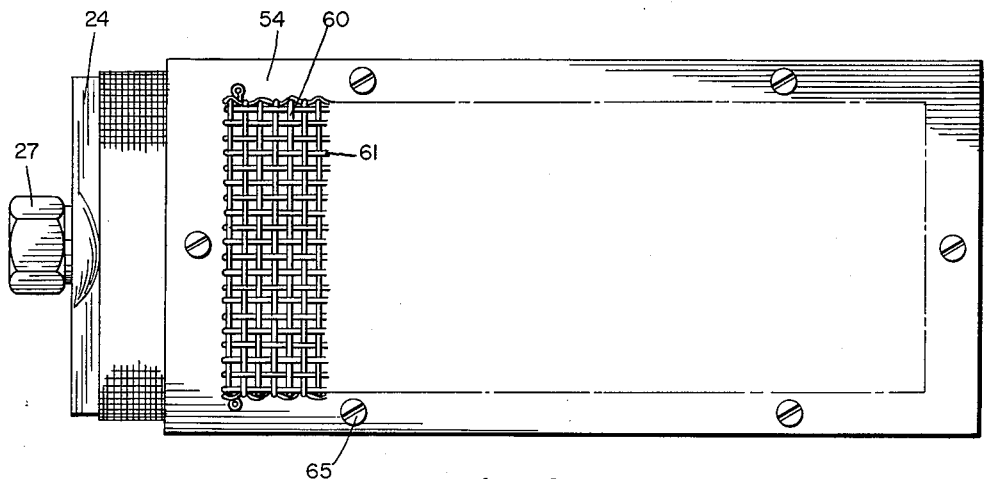
FIG. 2 is a top plan view thereof.

Referring now to the drawings, throughout which like parts have been designated by like reference characters, the burner includes a housing which may be made of cast metal and includes a bottom wall 10, side walls 11, an end wall 12 and an inlet end 13. The top of the housing has an open face and is provided with a flat peripherally extending flange 14 having bosses 15 on the underside of the flange for the reception of screws 65 which may be threaded into the bosses through the openings 16. The housing below the flange 14 then provides a plenum chamber.

Figure 1:
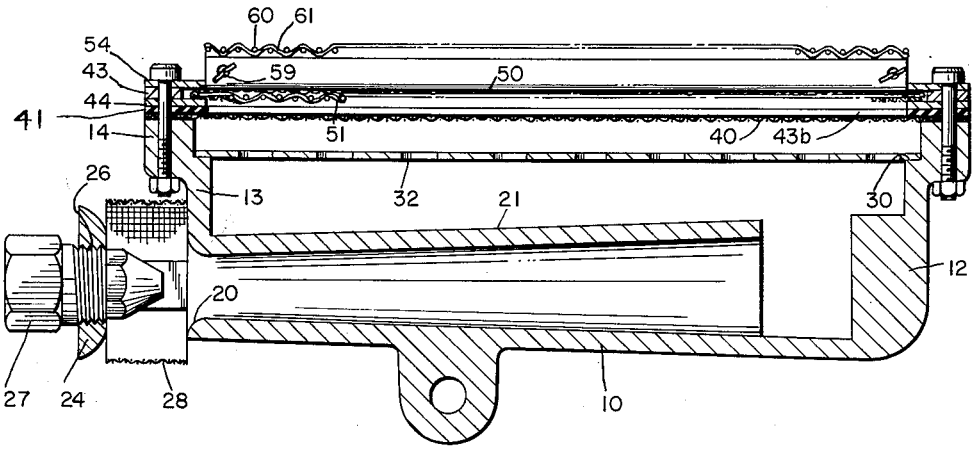
FIG. 1 is a vertical longitudinal medial sectional view of a first embodiment of a generator made according to our invention.
Figure 3:
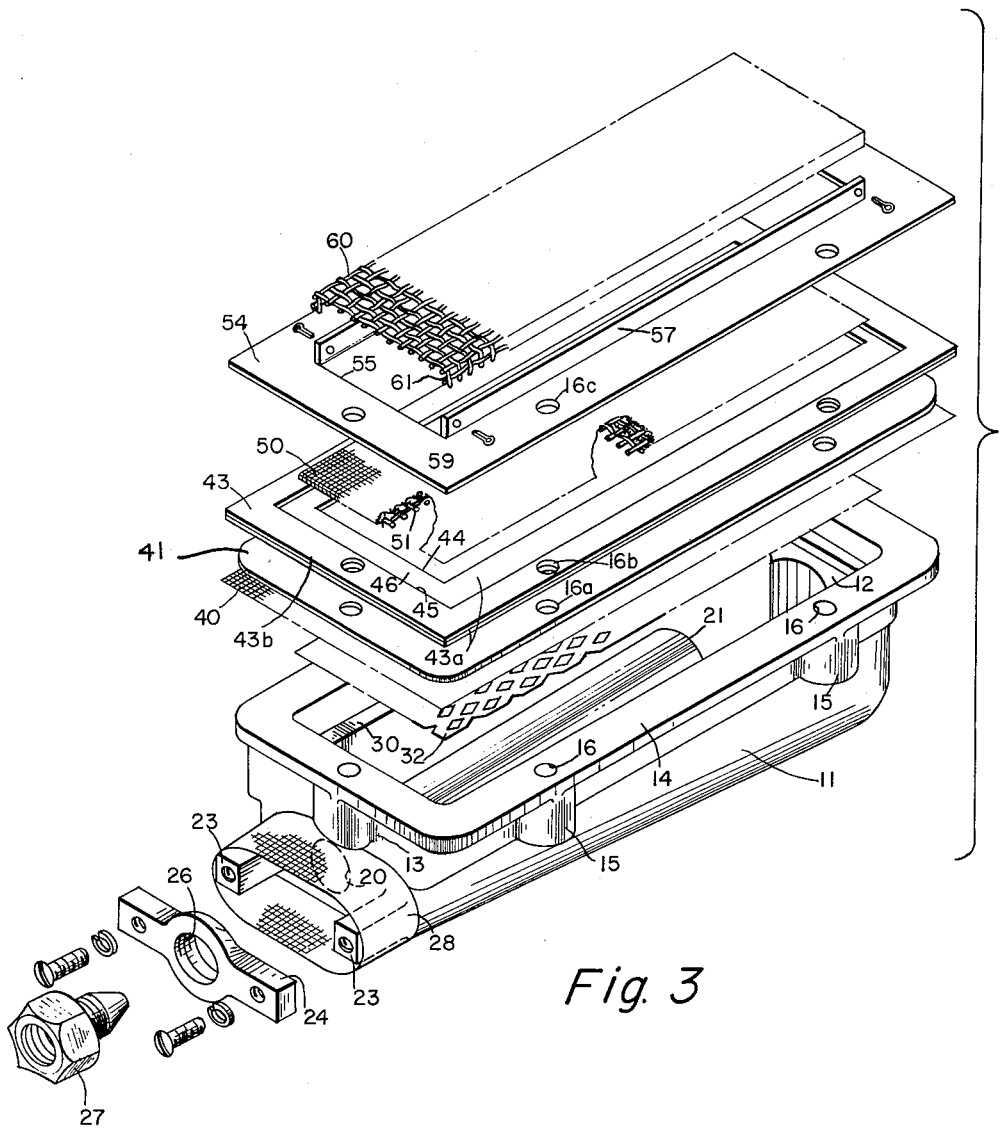
FIG. 3 is an exploded perspective view showing the various parts.

The inlet end of the housing is provided with an opening 20 which communicates with a venturi tube 21 cast integral with the bottom of the housing. Outwardly, the opening 20 is flanked by a pair of bosses 23 arranged to support a yoke 24, the yoke being held onto the bosses by screws extending through the yoke and threaded into the bosses. The yoke is provided with a threaded center part 26 for the reception of a fuel orifice spud 27. At its center part 26 the yoke presents a convexly curved surface which faces forward in the direction of the gas flow, as best shown in FIG. 1, to prevent air turbulence, increase the support area for the orifice member and increase the air inlet area above and below the yoke.

It will be understood that the orifice may be changed to provide the desired size and that a range of adjustment relative to the orifice is provided by its threaded connection.

A wire mesh wind screen 28 is provided and may comprise an endless loop of wire mesh held in place by its own resiliency and engaging with the outer corners of the bosses 23. This screen can also be a strip, wrapped around the bosses and held in place by a suitable clamp or wire. It could also be a piece of foraminous metal. This screen is located just in front of the yoke 24, as best seen in FIG. 1.

Inside of the housing the walls are provided with an upwardly facing baffle support ledge 30, which may extend around the inner walls of the housing spaced slightly from the top and be formed in any suitable manner.

A fuel mixture baffle and distribution plate 32 is seated on the ledge. Preferably, the plate is large enough so that it engages with the walls of the housing above the ledge sufficiently tight that no other fastening means is needed. It could be secured in place by suitable fastening means, such as screws, if desired.

It has been found that a piece of expanded metal, of which there are many varieties well known in the art, may be used as the baffle. Preferably, it is desired that the portions between the holes be of a width to provide a good baffle and to enhance an even distribution of the fuel mixture therethrough and an equalization of the gaseous mixture flow to the open face.

Although a baffle coextensive with the top opening of the housing and spaced below the top is described, it will be appreciated that other types of baffles may be effectively used so long as an even distribution of fuel mixture is accomplished below the burner or generator screen. These may include plates of various sizes.

Seated on top of the flange 14 is a first wire mesh or cloth reflector or safety screen 40. Preferably, this screen is a 40 mesh screen composed of 0.010 inch diameter wire and having an open area between the wires of 36% of the total face area of the screen. The screen wires are formed of any suitable metal, such as iron or stainless steel.

Surmounting the screen 40 on the flange 14 is a rectangular frame which comprises a gasket 41 and can be made of asbestos, soft metal or any heat-resisting material. It is provided with apertures 16a which align with the apertures 16 for the reception of screws shown in FIG. 2.

Next above the gasket is a rectangular metal grid frame 43, which is of laminated construction comprising a lower portion 43a having a window opening 44, and an upper portion 43b having a larger opening 45. This provides an upwardly facing rectangular seat 46 for the reception of the burner screen, generator or grid screen.

The burner screen, grid screen or generator screen includes a fine mesh or cloth screen 50. It is quite important to the improved performance of the present invention that the burner screen 50 be substantially identical to the safety screen, for reasons which will be stated hereinafter. Accordingly, the burner screen is 40 mesh and has an open area of substantially 36% of its total face area. The edges of the screen 50 are folded about a support or stretched grid 51 which may be a stiff piece of heavy coarse mesh screen preferably having the mesh openings of approximately 8 to 10 mesh. The fine screen and the support grid provide a unitary generator screen which seats on the seat 46 and is retained on the seat by a top retainer frame 54. The top frame or screen retainer 54 is a rectangular frame, of a width sufficient to cover the frame 43 including the seat 46 and having an opening 55 therein coextensive with the opening 44 in the frame 43. The frames 43 and 54 thus provide a screen retainer. Likewise the two frames are provided with screw holes 16b and 16c for registration with the other holes 16 and 16a and the reception of the screws.

The burner screen or generator screen unit, composed of the fine mesh burner screen proper 50 and the rigid coarse mesh grid 51 which supports it, is smaller, both lengthwise and from side to side, than the opening 45 in the frame 43 where it is mounted. Also, while the burner screen unit 50, 51 has a sung fit between the frame members 43 and 54, it is not restrained against sliding movement in the frame as it expands or contracts under temperature changes. Because of this the burner screen is capable of lateral expansion and contraction due to temperature changes without losing its flat configuration. This is extremely important to the operation of the present invention, as will appear hereinafter.

As already stated in the preferred embodiment the burner screen 50 (and the safety screen 40, also) has an open area between the wires of 36% of the total face area of the screen. Practical experience has demonstrated that this percentage of open screen area produces optimum performance since the area is so small that there is no critical fuel pressure at which the flame will flash back behind the burner screen, and at the same time there is not an excessive back pressure behind the burner screen. The percentage of open area of the burner screen may vary to some extent from this 36% value, so long as these operating characteristics are maintained.

The diameter of the wires which make up the burner screen 50 is sufficiently small (in this case, 0.010 inch) that air cooling of the back side of the burner screen keeps the temperature there below the ignition point of the fuel-air mixture so that flash back does not occur.

The top screen retainer frame 54, is provided with a pair of upwardly extending flanges 57 which run lengthwise of the burner on opposite sides of the opening 55 in this frame and are arranged to receive and hold by fasteners a reverberator screen 60 which is of substantially coarser mesh than the burner screen proper 50, such as 6 to 10 mesh. The reverberator screen 60 is provided with downwardly extending flanges 61 adapted to fit on the outer surface of the flanges 57. The height of the flanges 57 determines the distance that the reverberator screen 60 is spaced from the generator screen 50, 51. The reverberator screen is held in place by suitable fasteners which may be simple cotter pins extending through the mesh of the screen and through holes 59 in the flanges 57.

The screws 65 securely hold the entire assembly together, being threaded into the bosses 15 and extending through the holes 16a to 16c, inclusive, with the heads engaging the top retainer member.

The operation of the device is as follows:

Suitable fuel is forced through the orifice spud 27 in a fine stream into the exposed area surrounded by the wire screen 28. This causes clean air to be inspirated with the fuel into the venturi throat in proper ratios to provide a high aeration combustible mixture. The fuel and air then pass into the venturi tube 21 where the gas and air mixture is accomplished. The venturi tube 21 also tends to decrease the velocity without creating a back pressure at the venturi throat. The mixture passes from the venturi into the plenum chamber below the baffle 32 which causes an even distribution of the mixture throughout the chamber and a further reduction in velocity. It is distributed evenly to the reflector or safety screen 40. The fuel then passes up through the safety screen, the stretcher screen 51 and the generator grid screen 50 and is ignited on the outside surface of the screen 50. The fuel burns at the outer surface of the grid screen. When the pressure into the orifice and the orifice spud is properly adjusted the ignited fuel provides a blue, substantially continuous carpet of very small flame jets evenly over the entire surface of the burner screen 50. The continuity of this carpet of flame is enhanced by the fact that the fine screen provides a large number of openings very close together. The tendency for the surface of the grid screen to heat up is utilized since it provides a highly incandescent radiator.

To further enhance the incandescent temperature on the grid radiator screen 50, the reverberator screen is disposed approximately 3/16 to 1/2 inch above the generator or grid screen. It is spaced beyond the range of flame impingement to enable complete combustion to take place. It acts as a damper to restrict hot gases from being wiped away too rapidly and also as a reflector to reverberate the infra red rays back onto the radiator to build up the temperature color.

Under these conditions, the infra red generator may then be operated by throttling the fuel supply to generate rays in any color found in the spectrum from black, 900° F., to yellow, 1800°, without danger of flash back.

It should be added that the heat is emitted from the reverberator screen and also from the generator or grid screen through the intersticies of the reverberator screen.

In the operation of this burner, the burner screen 50 is at a substantially higher temperature than the reverberator screen 60. Therefore, the burner screen itself constitutes the main radiator element in the present burner. The extremely high temperature at which the burner screen operates depends upon the presence of the reverberation screen, which reflects heat back to the burner screen and raises the latter's temperature to incandescence.

Such operation of the burner screen at incandescence would not, as a practical matter, be possible in the absence of the safety screen 40 just ahead of the burner screen. This safety screen which, as already pointed out, must be of substantially the same mesh as the burner screen 50, substantially prevents heat from being radiated from the incandescent burner screen back to the plenum chamber, which would tend to cause combustion to take place in the plenum chamber. If the safety screen were of substantially coarser mesh than the burner screen (that is, with a greater percentage of open area between the wires) then an excessive amount of heat would be radiated back from the burner screen and through the safety screen to the plenum chamber, with the likelihood of causing combustion to take place there. If the safety screen were of substantially finer mesh than the burner screen (that is, with a smaller percentage of open area) it would tend to produce back pressure which would result in incomplete combustion.

With the particular type of burner screen incorporated in the present burner it is not necessary to depend on the speed of flame propagation for the adjustment of capacity. Accordingly, it is possible to operate the burner over the entire spectrum from 900° F. to 1800° F. simply by adjusting the inlet fuel pressure.

Another important aspect of the present invention resides in the fact that the venturi inlet throat 20 is completely unobstructed and open for the inspiration of primary air into the burner. There is no shutter or other damper here which would impede the inspiration of air into the venturi. Because of this, adequate air is inspirated into the burner which is effective to produce the described low blanket of flame at the burner screen and the burner screen becomes heated to a higher temperature than was considered possible heretofore in atmospheric or low pressure burners. In actual practice the burner of the present invention is capable of operation at 1800° F. for an indefinite period of time. Also, the air-fuel ratio in the present burner remains substantially constant over a rather wide range of fuel pressures at which the burner may be operated. Accordingly, to reduce the operating temperature and heat output of the burner all that is necessary is to throttle down the fuel pressure, there being no danger of flash back when such throttling takes place because of the rather small percentage of open area in the burner screen.

Another practical advantage of the present invention is that the entire burner head, composed of the frame 43, 54, safety screen 40, burner screen 50, 51 and reverberator screen 60, is removable as a unit from the main burner housing 11 when replacement or inspection is necessary.

As the burner screen unit 51, 50 heats up it expands laterally in the channel formed between the frame members 54 and 43. Such free lateral expansion enables the burner screen to remain flat and evenly spaced from the overlying reverberator screen 60 throughout the surface extent of the respective screens. Because of this novel arrangement there is established an exceptionally uniform temperature across the entire surface of the burner screen which greatly enhances the performance of the burner.

In FIGS. 4 to 12 we have illustrated another embodiment of the invention wherein a housing is provided having a bottom wall which comprises a lower part 110 and an upwardly offset part 110a and has the upstanding side walls 111. It also has front and back end walls 112 and 113, the entire housing above the bottom forming a plenum chamber. The lower part slants upwardly slightly as best shown in FIG. 4. The upper part of the housing is provided with a laterally outwardly extending peripheral flange 114, which, as will later appear, supports the generator element.

The end wall 112 is provided with an opening 120 which opens into the venturi tube 121. This tube is preferably cast integral with the housing, but could be a separate element if desired.

Above the venturi inlet opening 120, there is provided a boss 114a to which an end plate 123 is secured. The end plate 123 extends downward in spaced relation to the venturi opening 120, as shown in FIG. 4, and has a semicircular bottom part 123a. The edges of the plate and the bottom part provide a support for a wind screen 128 which may be a strip of wire mesh, the upper ends of which are doubled back upon themselves and secured to the edges of the plate by screws.

Centrally of the end plate and in alignment with the center of the venturi opening 120, a connector 127 is provided which is threaded through an opening in the end plate and carries an orifice spud 127a which is in turn threaded into the connector 127. The orifice spud carries the usual orifice, the size of which may be predetermined. Usually it will be found that several orifice spuds having different sizes of orifices will be provided so that a spud having the proper size orifice may be selected for providing the best desired results.

Figure 7:
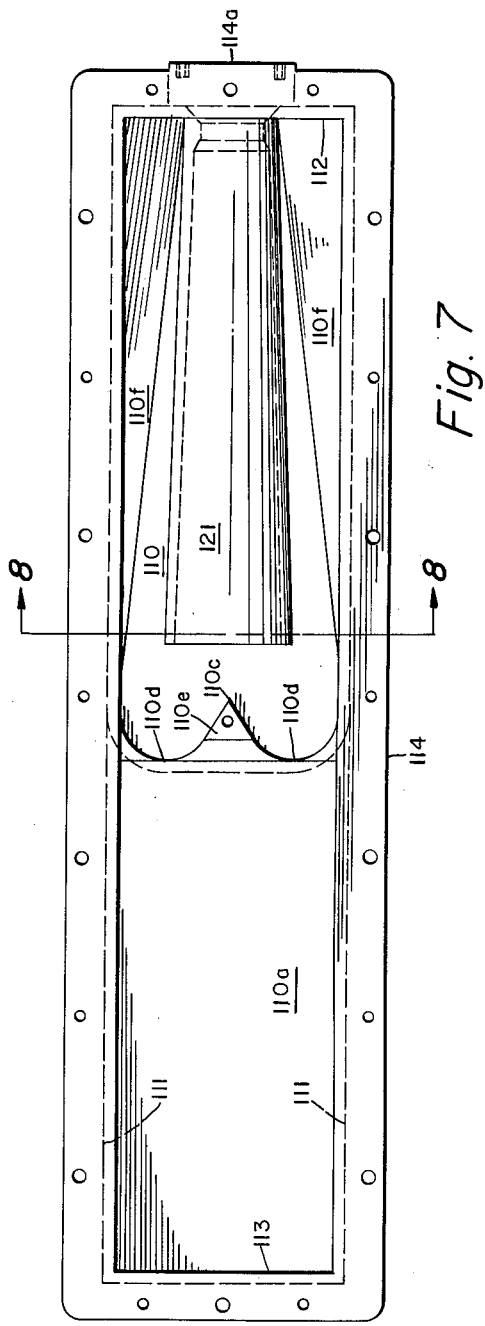
FIG. 7 is a plan view of the housing or plenum chamber.
Figure 8:
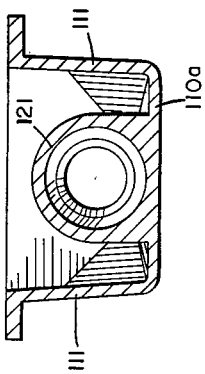
FIG. 8 is a section taken along the line 8—8 in FIG. 7.

As best illustrated in FIGS. 4 to 7, the bottom of the housing at the juncture of the parts 110 and 110a provides a vertical wall which is opposite to the end of the venturi tube 121. As best seen in FIG. 7, this wall has a part 110c which provides a wedge shaped projection extending toward the vertical center line of the venturi outlet. This part merges on each side with two semicylindrical parts of the wall at 110d.

On each side of the venturi, the bottom wall is provided with slanting surfaces 110f of generally triangular formation, which slant upwardly and outwardly toward the end wall 112.

The part 110c projects above the bottom wall (FIG. 4) and provides a support 110e (FIG. 7) on which is secured a baffle member 132, FIG. 4. The baffle is made of foraminous metal, and is of a width such that it spans the distance between the side walls 111 of the housing. One end extends partially across the venturi outlet at 132a and the other end extends over the bottom wall 110a and terminates in a downwardly extending lip 132b.

The flange 114, which extends around the top of the housing, and is generally rectangular in formation, provides a seat for the generator elements. A gasket 141, which may be of suitable material such as asbestos or other heat-resisting material, rests on the flange and provides a seal for the generator element frame, which rests on the gasket.

The generator element, FIGS. 9 and 10, includes a frame which, as stated, is seated on the gasket. It comprises a bottom rectangular frame member 143 of metal of substantially the same shape as the flange 114. The frame 143 is surmounted by a narrow rectangular frame member 143a and this in turn is topped by another frame member 143b which is the same width as the bottom 143 to thus provide a rectangular channel inside the middle frame member 143a and between the bottom and top frame members 143 which extends around the inner periphery of the frame for the reception of the generator elements.

Preferably, in the interest of economy, the frame members may be of composite construction, as best shown in FIG. 9, wherein the side runs of the frames 143 and 143b extend to and abut the end runs 143b. The end runs extend the full width of the frame. The intermediate narrow frame parts 143a have side runs extending the full length of the frame and the end runs abutting the side runs so that at each corner there is an overlap joint. The entire frame assembly is then secured by spot welding along the side and end runs.

The side runs of the top frame member 143, as best illustrated in FIGS. 9 and 10, are provided with longitudinally extending flanges 143c at the inside which extend upward and incline outward at a slight angle. These may have apertures 143d, FIG. 4, for securing the reverberator screen to the frame assembly, as later described.

The frame assembly is provided with a plurality of holes 145 in all its runs which line up with threaded holes in the flange 114 and screws 146 are used to secure the frame tightly in place on the flange.

The generator grid or burner screen unit (FIGS. 11 and 12) comprises an outer grid screen 150 of rectangular formation, the marginal side parts 150a of which are folded over the long edges of a spreader screen 151 and an inner screen 152. The longitudinal edges are then tightly compressed to hold the assembly together to hold the inner screen and spreader screen under tension. When so assembled, the entire generator grid or burner screen unit may be slipped into the channel in the frame.

The outer and inner screens 150 and 152 may be a 40 mesh screen with the wire diameter 0.010 inch in diameter to provide an open area between the wires of 36% of the total face area of the screen. The spreader screen 151 which provides a support for the other screens and prevents them from buckling may be a 10 mesh screen with wires 0.025 inch in diameter.

In order to effect this assembly easily the left end frame members 143b (FIG. 9) initially are not welded at the corners. The generator grid may then be slipped into the channel, after which the left end of the frame is placed in position and then the corners are spot welded to complete the frame and hold the grid in place. The thickness of the marginal compressed portions of the grid assembly is such that it is a snug slip fit in the channel. This permits it to be placed in position during assembly and also allows a free expansion and contraction during use so that heating and cooling expansion may take place thereby insuring that the generator grid or burner screen remains flat, as well as increasing the life of the grid. To enable this action, the width and particularly the length of the grid are such that it does not bottom in the channel. This can be seen from FIG. 4.

Figure 5:
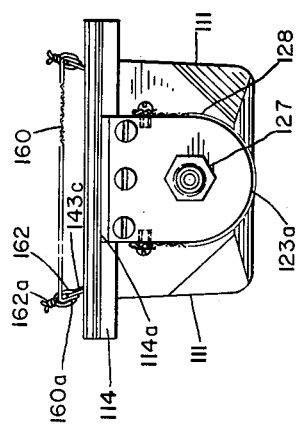
FIG. 5 is an end view of the generator of FIG. 4.

As previously mentioned, the top side runs 143b of the frame are provided with upwardly and outwardly extending flanges 143c. These support a reverberator screen 160 which comprises a flat planar center portion and a pair of inwardly inclined side flanges 160a, as best seen in FIG. 5. The reverberator screen is of substantially coarser mesh than the burner screen or generator grid, such as 6 mesh, with the wires of .041 inch in diameter. The reverberator screen is secured to the flanges 143c, as best shown in FIG. 5 by placing the flanges 160a on the outside of the flanges 143c and tying the same in place by loops of wire 162 which extend through the holes 143d in the flange 143c and through the screen, after which the ends are twisted at 162a to hold the screen in place above the generator grid assembly and in spaced relation thereto.

In operation, gas and/or fuel vapor is supplied to the connector 127 under pressure and is discharged through the orifice spud 127a in a fine stream through the exposed area surrounded by the wind screen. The wind screen prevents deflection of the fuel stream and also stops large dust particles from being taken in with the inspirated air into the venturi throat. The air is sucked into the venturi due to the pressure of the fuel stream and is there mixed with the fuel, the venturi being large enough to provide maximum aeration of the fuel. The action of the venturi tube 121 also tends to decrease the velocity without creating back pressure in the throat.

From the venturi the mixture emerges at the baffle where it is turned back on both sides by the combination of the baffle 132 and the diverting walls 110c and 110d. This causes the velocity to be decreased and the pressure throughout the plenum chamber to be equalized as well as further thorough mixing of the mixture.

The mixture then passes upward through the inner screen 152, the spreader screen 151 and the grid screen 150. It is then ignited on the outer surface of the grid screen. When properly adjusted the ignited fuel provides a blue carpet of very small flame jets that are evenly distributed over the entire surface of the grid screen. The flame height will normally be from $\frac{1}{16}$ to $\frac{1}{8}$ inch. The continuity of the flame carpet is enhanced by the fact that the fine screen results in a large number of openings very close together.

The tendency of the grid screen surface to heat up is utilized since it provides a highly incandescent radiator.

The reverberator screen is placed approximately $\frac{1}{4}$ to $\frac{1}{2}$ inch above the grid screen and beyond the line of impingement of the flame so that complete combustion is effected, it also acts as a damper to prevent hot flue gas from being wiped away too rapidly and as a reflector to reverberate the infra red rays back to the radiator or grid screen to build up temperature color.

Under the above conditions, the fuel supply may be throttled to control the color in any band of the spectrum between 900° F. (black) and 1800° F. (yellow) without danger of flash back into the plenum chamber.

When the generator grid assembly is worn out, it may quickly be replaced with a new assembly and the old one retained for replacement of the screen if the frame is in good condition. Due to the snug slip fit of the generator grid or burner screen unit, such expansion or contraction as occurs is allowed to occur freely, the parts sliding in the frame channel which prevents buckling of the screen and increases its life. At all times in the operation of the burner the generator grid or burner screen unit remains flat and evenly spaced from the reverberator screen, thereby enabling the maintenance of a uniform temperature across the entire burner for optimum performance.

Having thus described our invention in some embodiments thereof, we are aware that numerous departures from the exact structures illustrated may be made by those versed in the art without departing from the spirit of the invention as defined in the appended claims.

We claim:

1. An infra red ray generator comprising a housing forming a plenum chamber and having a stepped bottom wall with a step generally midway thereof forming a portion at a level below that of the other portion, a venturi mixing chamber having an outlet disposed in the plenum chamber adjacent to the rise of the step, said step forming a baffle disposed in the path of a combustible mixture emerging from the outlet of the venturi to spread the mixture from its path of travel, a baffle member supported on said step comprising a foraminous plate extending in a spaced parallel relationship above the uppermost bottom wall and toward the venturi outlet and closely spaced therefrom, said plenum chamber having an upper outlet, a generator grid frame carried at the outlet of the plenum chamber and comprising a channeled member, a generator grid assembly including a fine mesh safety screen, a rigid coarse mesh spreader screen juxtaposed to the safety screen, a fine mesh generator screen juxtaposed to the spreader screen on the opposite side and means to hold said screens together as a unit, said assembly being slidably disposed in said channel of said grid frame and movable therein.

2. A device as described in claim 1, wherein a reverberator screen of coarse mesh disposed above the generator screen in spaced relation thereto and just beyond the point of impingement of a flame on the generator screen.

3. An infra red generator comprising a plenum chamber having a bottom wall having a step generally midway of the length thereof, a venturi mixing chamber having an outlet disposed adjacent to the step on said bottom wall in the lower part of said chamber, a baffle carried by said step and having a portion extending toward and closely spaced from the venturi outlet and above the path of travel of gases from the venturi outlet and a part extending beyond the step over the bottom wall of the chamber in spaced relation thereto, a generator grid frame carred by said chamber at the outlet thereof, a generator grid assembly slidably carried by said frame and including a fine mesh safety screen, a fine mesh generator screen and a stretcher screen, said generator screen being folded about the edges of the stretcher and safety screen and all being closely juxtaposed to each other.

4. The combination of claim 3 wherein a flat reverberator screen is mounted on the housing at the outer side of said burner screen assembly and evenly spaced from said assembly.

5. The combination of claim 4 wherein said housing carries a frame defining a channel which receives the periphery of the burner screen assembly, said frame having outwardly protruding portions which engage the reverberator screen and position the latter at predetermined spacing from the burner screen assembly.

6. In a gas-fired, infra-red ray generator comprised of a housing having a base and side walls defining a plenum chamber and having a burner opening, a burner screen assembly extending across said opening and means for supplying a gaseous-fuel air mixture under pressure to said chamber, the improvement which comprises said burner screen assembly, including a safety screen facing towards said chamber, a stretcher screen on the side of said safety screen remote from said chamber and a burner screen on the side of said stretcher screen remote from said safety screen, said stretcher screen being of relatively rigid coarse meshed screening and said safety screen and burner screen being of a relatively fine mesh, relatively flexible screen material and rigidly fastened to said stretcher screen at the edges.

7. The improvement of claim 6 wherein said safety and burner screens are each formed of approximately a forty-mesh screen with a wire diameter of approximately .010 inch in diameter and the stretcher screen is approximately a ten mesh screen with a wire diameter of approximately .025 inch in diameter.

8. The improvement of claim 6 wherein the edges of said burner screen are folded back over the edges of said safety and stretcher screen whereby all of said screens are in substantially touching engagement.

9. The improvement of claim 6 wherein said housing walls have a continuous channel facing across said burner opening and said burner screen assembly is mounted in said channel and has external dimensions when cold less than the maximum dimensions of the base of said channel.

10. The improvement of claim 6 wherein a coarse meshed reverberator screen extends parallel to said burner screen and is spaced therefrom a distance greater than the maximum length of flame in said burner screen.

11. The improvement of claim 6 wherein a continuous frame is fastened to the ends of said chamber walls and said frame has a continuous channel facing across said burner opening and said burner screen assembly is mounted in said channel.

12. The improvement of claim 11 wherein said frame is a unitary member and is removably supported on said housing.

13. The improvement of claim 12 wherein a reverberator screen extends in spaced parallel relationship to said burner screen and said frame has lugs extending away from said housing coacting with said reverberator screen for holding same in position, whereby said screens and frame may be readily removed from said housing as a unit.

14. A burner screen assembly for an infra-red generator comprised of a safety screen, a stretcher screen and a burner screen all arranged in substantial side-by-side engagement with said stretcher screen being in the middle, said burner screen and safety screen each being relatively flexible and of approximately forty mesh with a wire diameter of approximately .010 inch, said stretcher screen being relatively rigid and of approximately ten mesh with wires of approximately .025 inch in diameter.

References Cited in the file of this patent

UNITED STATES PATENTS

| | | |
|---|---|---|
| 366,780 | Love et al. | July 19, 1887 |
| 455,223 | Knight | Jan. 27, 1891 |
| 731,384 | Newbold | June 16, 1903 |
| 1,135,840 | Oudeville | Apr. 13, 1915 |
| 1,977,947 | Lutenbacher | Oct. 23, 1934 |
| 2,870,830 | Schwank | Jan. 27, 1959 |

FOREIGN PATENTS

| | | |
|---|---|---|
| 1,108,655 | France | Sept. 29, 1954 |
| 1,127,936 | France | Aug. 20, 1956 |
| 1,154,077 | France | Oct. 28, 1957 |
| 4,569 | Great Britain | of 1911 |
| 450,550 | Great Britain | July 20, 1936 |
| 494,087 | Great Britain | Oct. 17, 1938 |
| 777,618 | Great Britain | June 26, 1957 |
| 529,640 | Italy | June 24, 1955 |